United States Patent [19]

Murray

[11] 4,042,306
[45] Aug. 16, 1977

[54] CONTROLLABLE CONNECTING APPARATUS

[75] Inventor: Kenneth R. Murray, Mentor, Ohio

[73] Assignee: Towmotor Corporation, Mentor, Ohio

[21] Appl. No.: 717,056

[22] Filed: Aug. 24, 1976

[51] Int. Cl.² ............................................. F16B 7/18
[52] U.S. Cl. ................................. 403/118; 403/320; 151/23
[58] Field of Search .................... 403/118, 46, 43, 48, 403/320, 319, 318, 316, 356, 358, 374, 409; 151/23

[56] References Cited

U.S. PATENT DOCUMENTS

| 1,379,394 | 5/1921 | Cocks | 151/23 |
|---|---|---|---|
| 2,580,482 | 1/1952 | Stuckenborg et al. | 403/46 |
| 2,588,064 | 3/1952 | Webb | 403/358 |
| 2,794,474 | 6/1957 | Stukenborg | 403/46 X |
| 3,472,302 | 10/1969 | Rosan et al. | 151/23 |
| 3,722,932 | 3/1973 | Dougall | 403/409 X |
| 3,918,779 | 11/1975 | Halliger et al. | 403/409 X |

*Primary Examiner*—Wayne L. Shedd
*Attorney, Agent, or Firm*—Frank L. Hart

[57] ABSTRACT

Connecting apparatus providing a pivotal connection controllably securing an actuating element at a preselected attitude.

8 Claims, 4 Drawing Figures

CONTROLLABLE CONNECTING APPARATUS

BACKGROUND OF THE INVENTION

In heretofore utilized apparatus for pivotally securing a mast to a hydraulic cylinder of a lift truck, the pivotal connection sometimes becomes loose in response to the impacts and vibration forces subjected thereon. If the connection becomes loose, the control over the amount of mast tilt is lost and, if the connection separates, the mast could fall from its generally upright position. When there are two cylinders each attached to a separate mast upright, the loading of each cylinder becomes unequal and causes high stress when one of the connection beams becomes loose.

This invention therefore resides in connecting apparatus providing a pivotal connection controllably securing an actuating element at a preselected attitude.

DETAILED DESCRIPTION OF THE INVENTION

Figure 1:
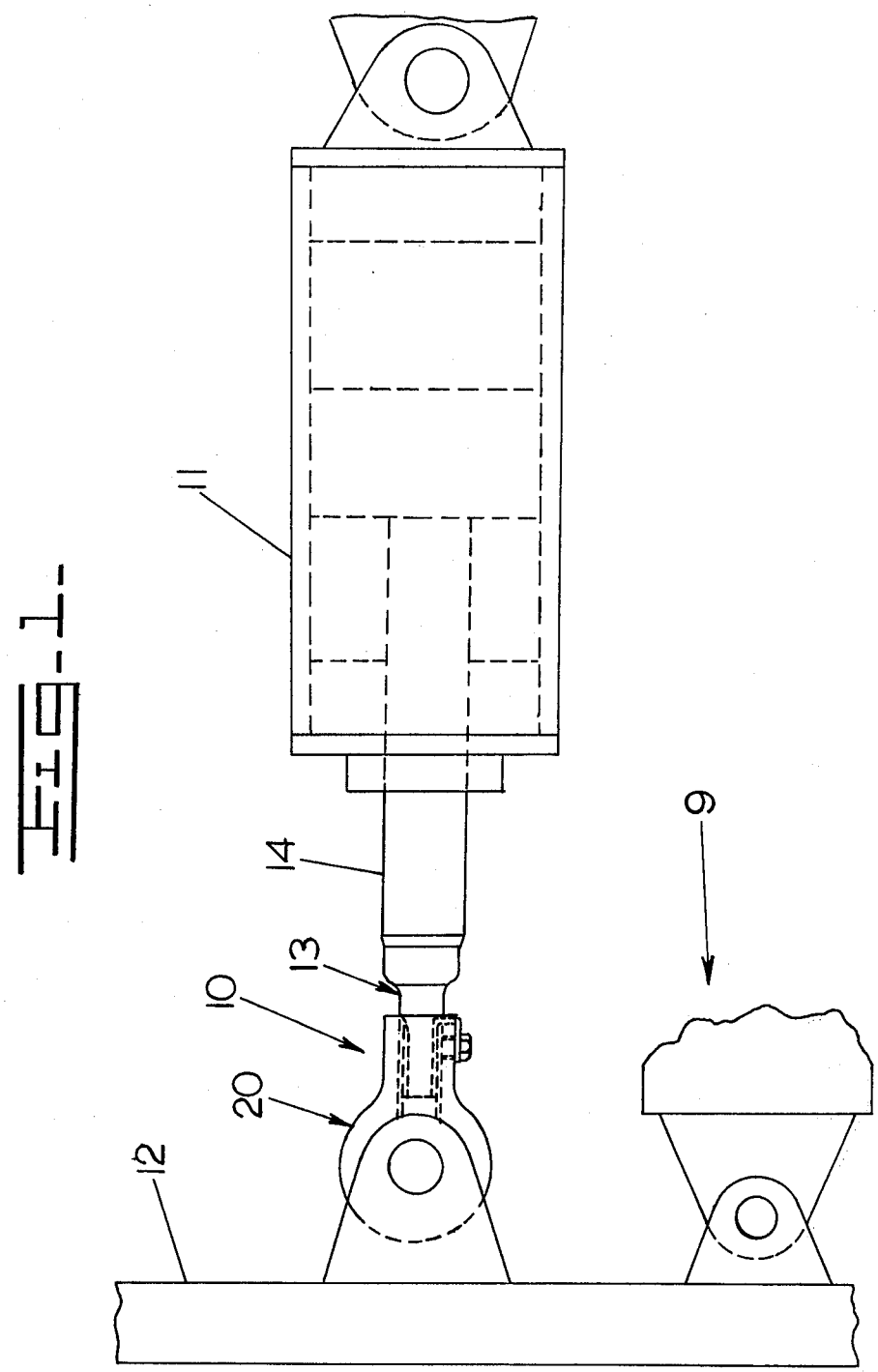
FIG. 1 is a diagrammatic perspective view of the apparatus of this invention connecting an actuating element of a hydraulic cylinder to the mast of a lift truck.

Referring to FIG. 1, the connecting apparatus 10 of this invention is being utilized for pivotally connecting a hydraulic cylinder 11 to a mast 12 of a fork lift truck 9, for example.

Figure 2:
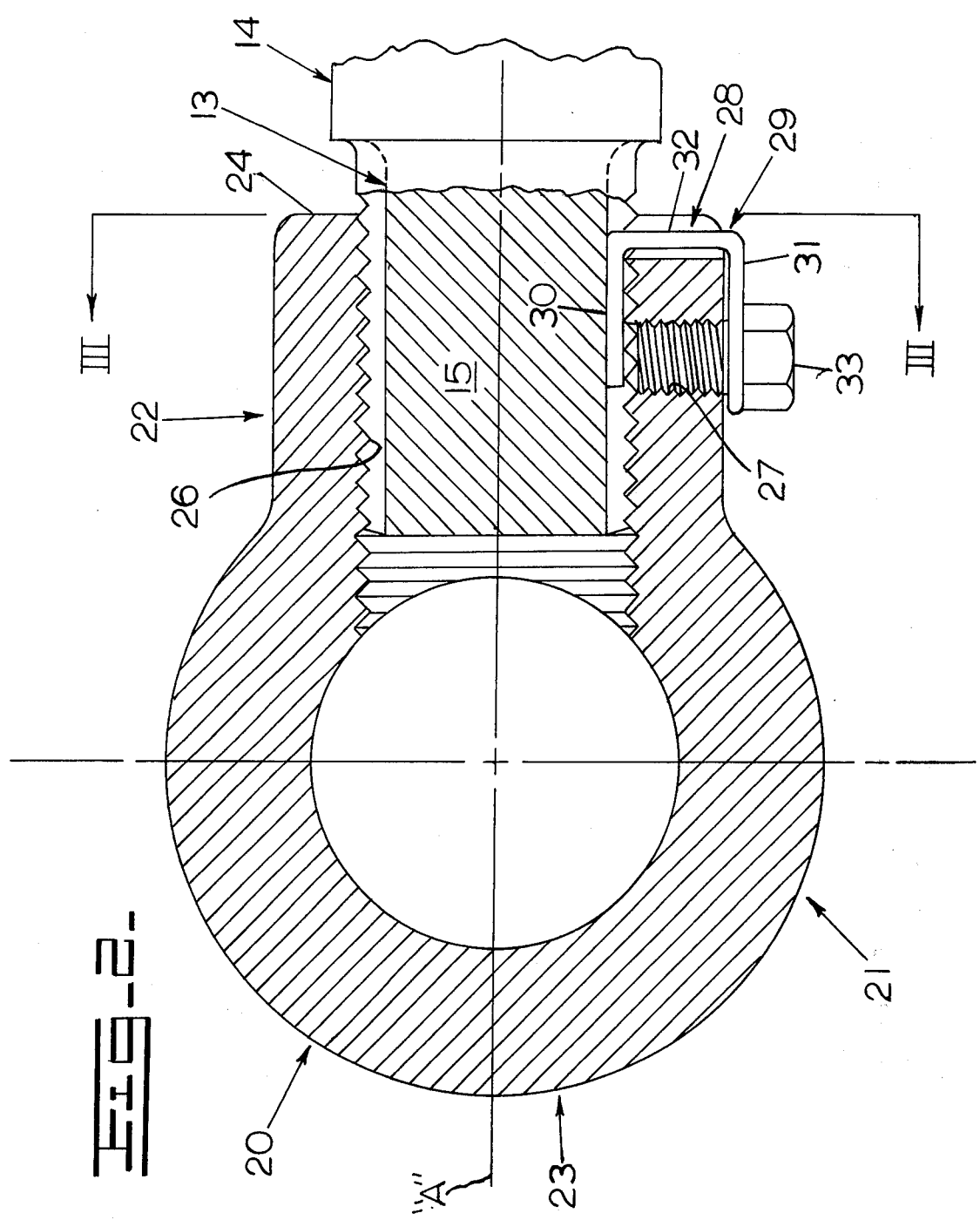
FIG. 2 is a diagrammatic side view of the eye element.
Figure 3:
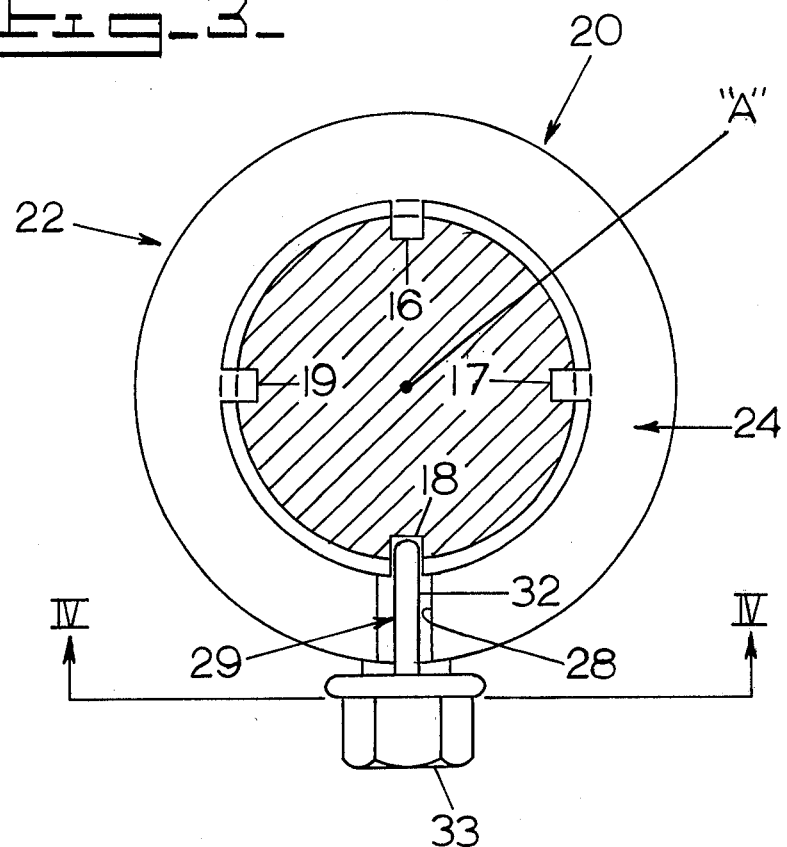
FIG. 3 is a diagrammatic end view taken along lines III—III of FIG. 2.

Referring to FIGS. 2 and 3, an actuating element 13 is connected to the piston rod 14 of the cylinder 11. The actuating element 13 can, however, be a unitary portion of the piston rod 14.

The actuating element has an end portion 15, threads formed on said end portion 15, and at least two, preferably four, arcuately spaced apart slots 16-19 extending through the threads (FIG. 3) and longitudinally along the end portion 15, as better seen in FIG. 1.

For providing additional strength to the apparatus 10, it is preferred that the depth of each slot 16-19 be greater than the depth of the threads of the actuating element 13, the depth of the slots 16-19 are of a preselected magnitude, as hereafter more fully described, and the slots 16-19 are preferably spaced one from the other a preselected common distance. In addition, there are preferably more than two spaced apart slots for improving the controlled positioning of the apparatus 10.

An eye element 20 has a longitudinal axis "A", first and second end portions 21, 22, and first and second ends 23, 24. The first end portion 21 has an opening extending therethrough substantially perpendicularly to the axis "A". The second end portion 22 has first and second threaded openings 26, 27. The first threaded opening 26 extends along the axis "A" and the threads are mateable with the threads of the actuating element 13 for threadably connecting one to the other. The second threaded opening 27 extends substantially perpendicularly to the axis "A".

As better seen in FIG. 3, a slot 28 is positioned at the eye element second end 24 and extends substantially perpendicularly to the axis "A".

Figure 4:
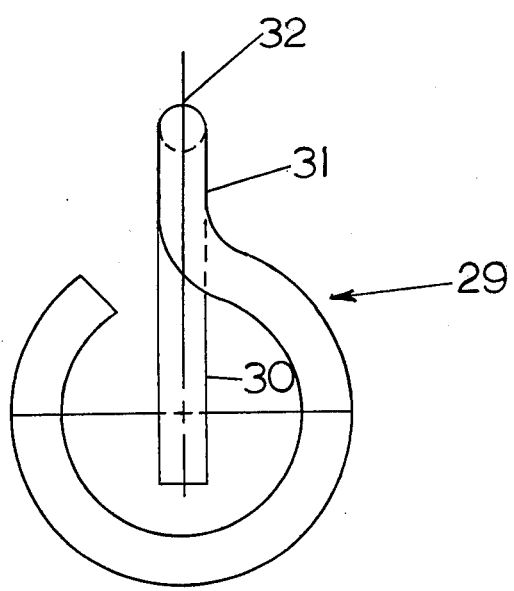
FIG. 4 is a diagrammatic view of the holding element taken along lines IV—IV of FIG. 3.

Referring to FIGS. 2-4, a holding element 29 is of a general "U" configuration and straddles a portion of the second end portion 22 of the eye element in the installed position. As seen in FIG. 2, the holding element 29 has first and second legs 30, 31 and a middle portion 32 connecting the legs 30, 31.

In the installed position of the eye element 20, actuating element 13, and holding element 29, the first leg 30 is positioned between the eye element 20 and the actuating element 13.

The first leg is of a size sufficient for extending along one of the actuating element slots 16-19, the middle portion 32 is of a size sufficient for positioning in the slot 28 of the second end 24 of the eye element 20, and the second leg is of a configuration sufficient for substantially completely encircling the second threaded opening 27.

Threaded means 33, for example a bolt, mates with the threads of the second threaded opening 27 of the eye element 20, extends over a portion of the second leg 31, and maintains the second leg 31 relative to said eye element 20.

In order to facilitate maintaining the holding element 29 relative to the eye element 20, the slot 28 is preferably of a depth greater than about one-half the thickness of the middle portion 32 of the holding element, the first leg 30 is of a size sufficient for contacting the bottom of an associated slot 16-19 and the first threads of the eye element in the installed position, and the legs 30, 31 are of a substantially common length. Preferably, the holding element 29 is of a generally circular cross-sectional configuration and can be formed of heavy wire.

By the construction of this invention, the eye can be controllably oriented at a plurality of positions by aligning one of the slots 16-19 with slot 28. The holding element prevents rotation of the eye element 20 relative to the activity element 13 and the positioning of the holding element middle portion 32 in slot 29 functions to prevent the holding element from moving relative to the end 24, thereby preventing even very slight rotations of the eye element 20 relative to the actuating element 13.

Other aspects, objects, and advantages of this invention can be obtained from a study of the drawings, the disclosure, and the appended claims.

What is claimed is:

1. Connecting apparatus providing a pivotal connection for controllably securing an actuating element at a preselected attitude, comprising:

said actuating element having an end portion, threads on said end portion, and at least one slot extending through the threads and longitudinally along the end portion;

an eye element having a longitudinal axis and first and second end portions and first and second ends, said first end portion having an opening extending therethrough substantially perpendicularly to the axis and said second end portion having a first threaded opening mateable with the threads of the actuating element and extending along the eye element axis, a second threaded opening at the second end portion and extending substantially perpendicularly to the eye element axis, and a slot at the eye element second end extending substantially perpendicularly to the eye element axis;

a holding element of general "U" configuration having first and second legs and a middle portion in the installed position of the eye element on the actuating element, said first leg being of a size sufficient for extending along the actuating element slot, said middle portion being of a size sufficient for positioning in the slot of the eye element second end, and said second leg being of a construction sufficient for substantially completely encompassing the second threaded opening; and threaded means for mating with the threads of the second threaded opening of the eye element, extending over at least a portion of the second leg of the holding element and maintaining said second leg relative to said eye element.

2. Apparatus, as set forth in claim 1, wherein the actuating element has a plurality of arcuately spaced apart slots.

3. Apparatus, as set forth in claim 1, wherein the depth of the slot is greater than the depth of said threads of said actuating element.

4. Apparatus, as set forth in claim 1, wherein the depth of the slot of the second end of the eye element is greater than about one-half the thickness of the middle portion of the holding element.

5. Apparatus, as set forth in claim 1, wherein the actuating element has four slots each arcuately positioned about 90° from an adjacent slot.

6. Apparatus, as set forth in claim 1, wherein the first and second legs of the holding element are generally of a common length.

7. Apparatus, as set forth in claim 1, wherein the first leg of the holding element is of a size sufficient for contacting the bottom of the slot and the first threads of the eye element in the installed position.

8. Apparatus, as set forth in claim 1, wherein the holding element is of generally circular cross-sectional configuration.

* * * * *